Feb. 27, 1923. 1,446,464.
G. HORVATH.
PUMP.
FILED OCT. 14, 1921. 3 SHEETS—SHEET 2.
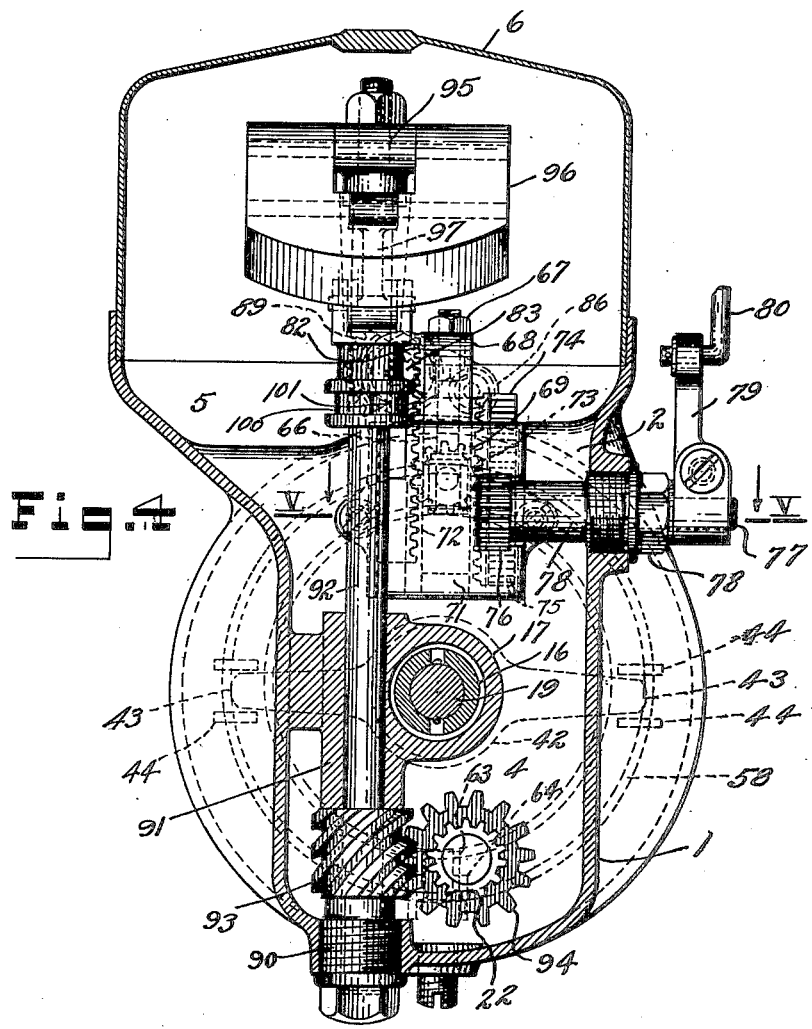
Fig.4
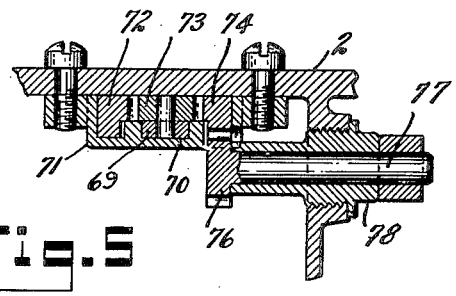
Fig.5
Inventor
Geza Horvath

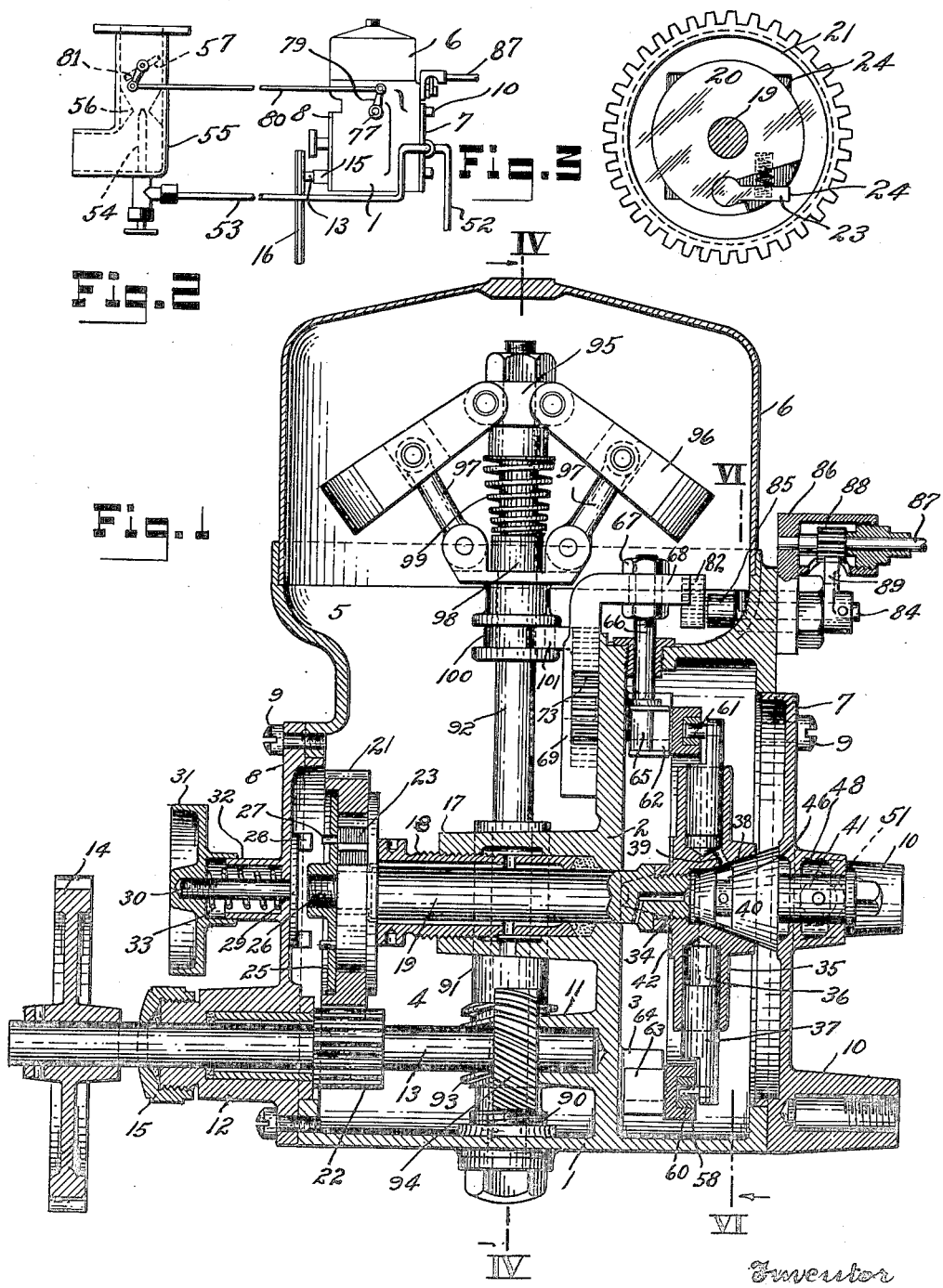

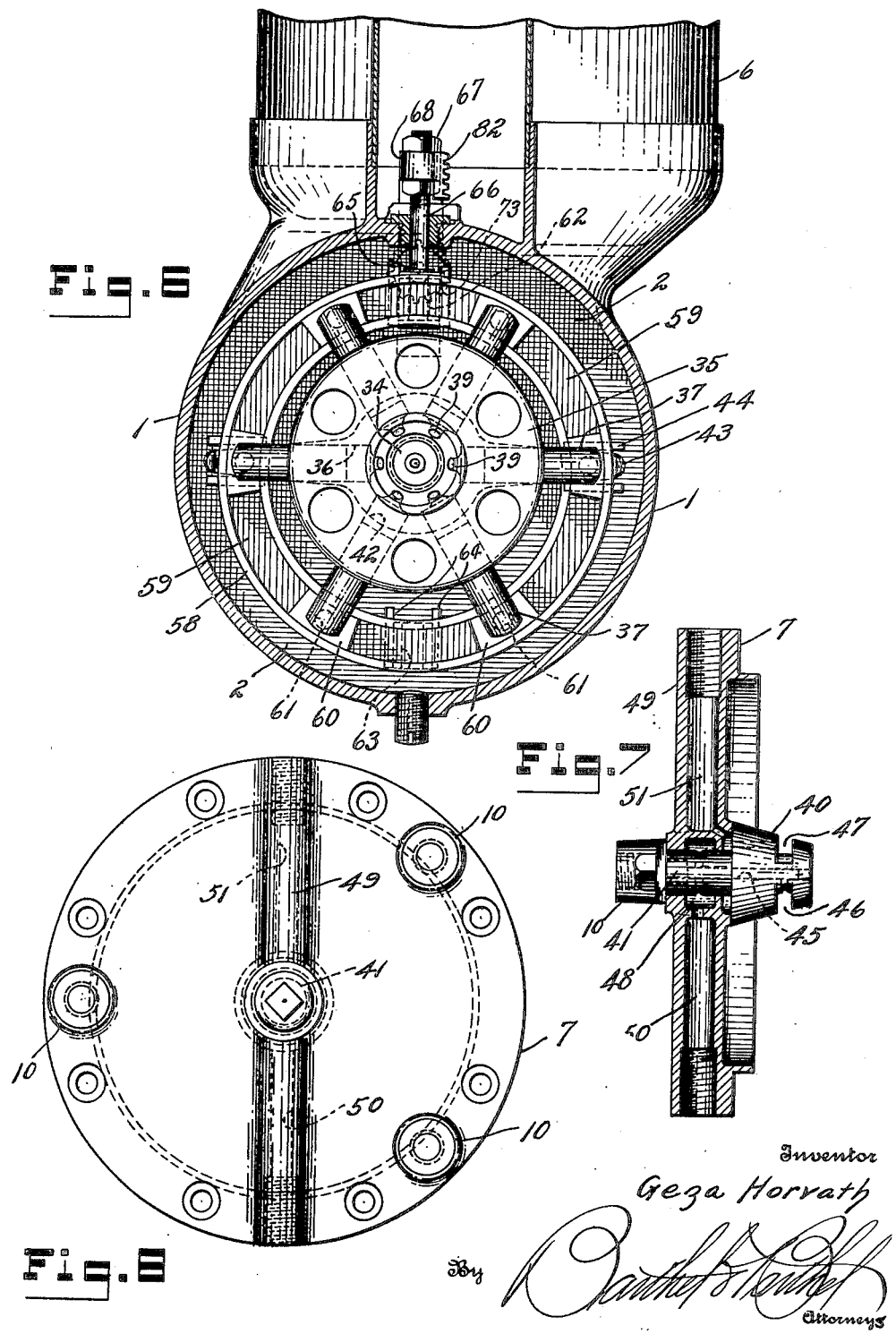

Patented Feb. 27, 1923.

1,446,464

UNITED STATES PATENT OFFICE.

GEZA HORVATH, OF HIGHLAND PARK, MICHIGAN.

PUMP.

Application filed October 14, 1921. Serial No. 507,685.

*To all whom it may concern:*

Be it known that I, GEZA HORVATH, a citizen of the United States of America, residing at Highland Park, in the county of Wayne and State of Michigan, have invented certain new and useful Improvements in Pumps, of which the following is a specification, reference being had therein to the accompanying drawings.

Considering the method of controlling the proportions of gasoline and air as used in the present type of carbureter for the internal combustion engine of an automobile, where the amount of fuel is controlled by the flow of air through the carbureter, various attempts have been made to properly proportion the fuel and air to meet the variable demands of the engine, because an engine requires fuel in proportion to the load it carries, regardless of speed. To secure good acceleration a very rich mixture is required for heavy loads, but after the car attains its momentum the amount or proportion of fuel may be reduced.

The above condition has been met in present type of carbureter partly by the addition of a well, or compensating jet, located between the needle valve and the ordinary jet of the carbureter, which well fills with gasoline at low speed but empties into the main supply when sudden demands are made upon the engine. The jet has, in the short time available, approximately doubled the amount of fuel to be atomized, and on a long grade the supply is soon exhausted. Another indication of a variable mixture required by the engine is shown by running on a level road with a properly adjusted mixture and then going down a grade. The popping in the muffler indicates a very rich mixture, so rich that the engine is unable to burn the same mixture that it will handle under load. In adjusting the existing carbureter to handle the heavy loads it is wasting fuel on the lighter loads. This same condition exists every time the throttle is suddenly closed, which happens frequently. This is not only wasting fuel but causes an accumulation of carbon deposits, and the existing type of carbureter for an engine, whose load and speed are fluctuating almost continuously, and the fuel governed by only air entering the engine, is entirely inadequate to meet the demands of the engine.

Considering engine speed, there is a wide range of loads from coasting down hill, where the car is pushing the engine, to climbing a grade, where the full power is required. In the present type of carbureter the same quality of gas would be supplied, whereas a very lean mixture is required in the case where the car is pushing the engine, and the richer mixture where the engine is carrying the full load. Ordinarily the carbureter is adjusted for a mixture to meet the heavy load, and it is evident that fuel is then being wasted on lighter loads, and that the waste is considerable.

With this résumé of existing conditions, my invention aims to provide an apparatus by which fuel may be forcibly supplied to an engine according to the load on the same and in proportion to the speed of the engine. If the speed of the engine increases beyond that required for a predetermined load the fuel is automatically cut down to operate on a lean mixture so that there can be no waste, and in order that all operating conditions may be met the apparatus is under manual control, to a certain extent, otherwise the supply of fuel is automatically controlled and regulated by the engine and the duty to be performed thereby. My apparatus includes a rotary pump which is driven from the engine or any suitable source of power in proximity thereto, and the pump is characterized by having a rotary cylinder block, reciprocatory pistons, and means including a governor, for varying the stroke and pump proclivities of the pistons. The last mentioned means also includes an adjustable eccentrically disposed piston abutment which may be adjusted automatically by the governor or manually. In either instance the greater the eccentricity of the piston abutment, the greater the pumping capacity of the pump. As the piston abutment approaches a concentric position relative to the cylinder block the pumping capacity is decreased, and since the action of the pump is controlled by the engine, through the governor, it is possible to supply fuel according to the demands of the engine and the duty performed thereby.

My pumping apparatus is adapted to be associated with a manifold or some intake connection, cylinder, mixing, or combustion chamber in which a throttle is mounted and articulated with my variable stroke pump, so that the throttle pump may be adjusted in synchronism. The intake connection has an air inlet and a spraying nozzle from which fuel may be sprayed to commingle with the air, and with the pumping apparatus in communication with a suitable source of gasoline or other fuel, the apparatus may be operated and automatically controlled so that there will be a proper admixture of gas and air for the work to be performed by the engine.

My pumping apparatus further includes a priming device for the pump; a clutch mechanism which permits of the priming device being used without turning over the drive shaft of the pump; lubricating means for the driven shaft of the pump; valvular means insuring a proper distribution of gasoline to the pump cylinders, and indicator actuating means by which an indicator may be operated to show either the quantity of fuel being used, the speed of the pump or engine, miles per gallon, or any other conditions that may be ascertained by virtue of the pumping apparatus.

My invention will be hereinafter described and then claimed, and reference will now be had to the drawings wherein—

Figure 1 is a vertical longitudinal sectional view of the pumping apparatus;

Fig. 2 is a side elevation of the apparatus relative to an engine intake manifold;

Fig. 3 is a detail view of the clutch adapted to form part of the pumping apparatus;

Fig. 4 is a vertical cross sectional view taken on the line IV—IV of Fig. 1;

Fig. 5 is a horizontal sectional view taken on the line V—V of Fig. 4;

Fig. 6 is a cross sectional view taken on the line VI—VI of Fig. 1;

Fig. 7 is a horizontal sectional view of a detached head of the pumping apparatus, and Fig. 8 is a side view of the head.

In describing my invention by aid of the views above referred to, I desire to point out that the same are intended as merely illustrative of the apparatus which has been put into practice, and since there are many types of internal combustion engines, carbureters and vehicles with which the pumping apparatus may be associated, I do not care to confine my invention to any details of construction or arrangement of parts, other than defined by the appended claims.

The pumping apparatus comprises a casing 1 provided with a partition 2 which divides the casing into a pump compartment 3, a compartment 4 for the operating mechanism, and a governor compartment 5, said governor compartment being closed by a dome or cover 6, suitably mounted on the casing 1. The pump compartment 3 has a detachable head 7 and the compartment 4 a detachable head 8, these heads being suitably secured to the casing 1 preferably by screws 9, and the head 7 and that side of the casing 1 adjacent said head has bosses 10 which will permit of the casing 1 being attached to the side of an engine or other support.

The partition 2 and the head 8 have alining bearings 11 and 12 for a drive shaft 13 which extends through a stuffing box 15 forming part of the bearing 12 and is provided with a power transmission wheel or member 14 which may be driven by a power transmission member 16 from an engine or some part operated thereby and not shown.

The pump compartment 3 is cylindrical and centrally of the partition 2 and extending into the compartment 4 is a long bearing 17 provided with a stuffing box 18 for a driven pump shaft 19 which extends into the pump chamber 3. The opposite end of the driven pump shaft 19 has a gear wheel body 20 and free to rotate, in one direction, on said body, is a gear wheel 21 meshing with a gear wheel 22 on the drive shaft 13. Set in the periphery of the gear wheel body 20 is a spring pressed pivoted pawl 23 adapted to engage in notches 24 of the gear wheel 21 and establish a driving relation, in one direction, between the gear wheel body 20 and the gear wheel 21. The construction of this gear wheel provides a one-way or overrunning clutch mechanism which permits of the driven pump shaft 19 being operated, in one direction, independent of the drive shaft 13.

The gear wheel 21 is retained on the gear wheel body 20 by a face plate 25 set in said gear wheel and retained therein by a threaded portion or end 26 of the pump shaft 19. The face plate 25 has opposed outwardly extending studs 27 adapted to be engaged by lugs 28 on a rotatable priming head 29 which has a stem 30 provided with a wheel or hand piece 31. The stem 30 is journaled in the detachable head 8 and the hand piece 31 has a sleeve portion telescoping a spring housing 32 carried by the head 8, said housing containing a coiled expansion spring 33 which encircles the stem 30. The expansive force of the spring 33 holds the priming head 29 normally against the detachable head 8, but the hand piece 31 may be pushed inwardly and then rotated so that the lugs 28 will engage the pins 27 and permit of the pump shaft 19 being turned over as the hand piece 31 is rotated. Releasing the hand piece 31 permits the expansive force of the spring 33 to restore the priming head 29 to normal position, thus permitting the pump shaft 19 to be driven from the shaft 13 without any interference by the priming device.

That end of the pump shaft 19 within the pump compartment 3 has a reduced exteriorly screwthreaded and ported stem 34, the port of said stem providing a vent in communication with the pump compartment 3. Mounted on the stem 34 is a cylindrical cylinder block 35 having a plurality of radially disposed cylinders 36 for reciprocable pistons or plungers 37.

Centrally of the cylinder block 35 is a valve chamber 38 and of the cylinders 36 communicate with said chamber by ports 39. The valve chamber 38 affords a conical seat for a normally stationary conical valve 40 having a stem 41 adjustable in the head 7 and co-axial with the shaft 19, said valve stem being adjustable so that it may be properly set relative to the chamber 38. The valve chamber 38 revolves about the stationary valve 40 and holding said chamber or the cylinder block in operative relation to said valve is a spring 42 which has a central portion constantly bearing against the cylinder block 35 and opposed arms 43 extending between lugs 44, carried by the partition 2. The expansive force of this spring compensates for wear between the cylinder block 35 and the valve 40 and prevents leakage of gasoline or other fuel as the cylinder block is revolved about the valve. The valve 40 is substantially hollow and its stem 41 has a longitudinal passage 45 with one end of the passage communicating with a side opening 46 in the valve 40, and opposite the opening 46 is another opening 47 communicating with the hollow valve. The valve 40 is seated against the inner face of the head 7 and said head has a central chamber 48 through which the stem 41 extends and has its passage 45 in communication therewith. In addition to the chamber 48 the head 7 has alining enlargements 49 provided with passages 50 and 51, the former communicating with the chamber 48 and the latter with a hollow valve 40, as best shown in Fig. 7. Either of the passages 50 or 51 may receive fuel, depending on the direction of rotation of the cylinder block 35, and assuming that the passage 51 receives gasoline or other fuel from a conduit 52 extending to a tank or other source of fuel, the fuel finds its way into the hollow valve 40 and the opening 47 which is adapted to register with ports 39 communicating with the cylinders 36 of the pump. The pistons 37 of the pump may draw the fuel into the cylinders 36 of the cylinder block 35 and since this block revolves on the stationary valve 40 the ports 39 will communicate alternately with the openings 46 and 47, consequently charges of fuel in the cylinders 36 may be discharged through the opening 46 and the passage 45 of the valve 40 into the chamber 48 and through the passage 50 to a pipe or conduit 53 connected to the enlargement 49 having a passage 50.

The conduit 53 may be connected to a needle valve, spray nozzle or fuel outlet device 54 of a carbureter or intake manifold 55 communicating with the combustion chambers or cylinders of an engine. The intake manifold 55 has been shown as having one end open to the atmosphere so that air may be drawn into the manifold and its passage through the manifold restricted by a venturi 56 adjacent the nozzle 54, and since the air will be forcibly drawn into the manifold it may assist in lifting fuel from the nozzle 54 for starting purposes. However, the air is adapted to commingle with and atomize the fuel forced from the nozzle 54 and by the rotary pump, and in the upper end of the intake manifold 55 is a conventional form of throttle 57 which may be manually adjusted.

Reference will again be had to the rotary pump. The outer ends of the pistons 37 are cut away or recessed to provide clearance for an adjustable ring 58 and said ring has an endless channel 59 in which slides segment shaped shoes 60 trunnioned on side pins 61 carried by the outer ends of the pistons 37. When the cylinder block 35 is revolved the shoes 60 slide around the ring 58 and if said ring is disposed eccentrically of the cylinder block 35 the pistons 37 are caused to reciprocate in the cylinders 36 and pump fuel from the tank to the intake connection or manifold 55. The ring 58 is adjustable relative to the cylinder block and may be raised and lowered in the pump compartment 3. On the face of the ring are sets of lugs 62 and 63 engaging guides 64 carried by the partition 2 and these guides prevent rotation of the ring 58 but permit of said ring being raised and lowered in the pump compartment 3.

Supporting the ring 58 by engaging the set of lugs 62 is the lower end 65 of a rod 66 which extends through the top wall of the pump compartment 3 and is adjustably connected, by nuts 67 or other fastening means to a right angular extension 68 of a pinion carrier 69 slidable in a groove 70 of a housing 71 suitably connected to the partition 2, as best shown in Fig. 5. The housing 71 contains a slidable governor rack 72 which meshes with a rotatable pinion 73 in the carrier 69 and the pinion 73 also meshes with a throttle rack 74 slidable on the housing 71. The throttle rack 74 has another set of teeth 75 meshing with a pinion 76 mounted on a shaft 77, journaled in a bearing 78 carried by a wall of the governor compartment 5. On the outer end of the shaft 77 is an adjustable crank 79 connected by a rod 80 to the crank 81 of the throttle 57 which is located in the intake manifold connection 55. It is now apparent that the throttle rack 74 may move in synchronism with the throttle 57, and when the throttle is manually adjusted the throttle rack 74, through the medium of the pinion 73, raises or lowers the carrier 69, the pinion 73 traveling on the governor rack 72. The operation may be somewhat the reverse. For instance, when the governor rack 72 is actuated by a governor, as will hereinafter be set forth, the pinion 73 may travel on the throttle rack 74 and shift the carrier 69 without moving the throttle rack 74 or the throttle 57 articulated therewith. In either instance movement of the pinion carrier 73 regulates the stroke of the pistons 37 in the cylinders 56, and as pointed out in the beginning the eccentricity of the ring 58 relative to the cylinder block determines the pumping capacity of the pump.

The angular extension 68 of the pinion carrier 69 has a small rack 82 meshing with a pinion 83 on a shaft 84, journaled in a bearing 85 carried by a wall of the governor compartment 5. The means of holding the bearing 85 in engagement with the wall of the governor compartment also serves to hold a bracket 86 in which is journaled an indicator shaft 87 provided with a pinion 88 meshing with a sector gear 89 on the outer end of the shaft 84. The indicator shaft 87 is of the flexible type adapted to extend to an indicator provided with suitable indicia by which adjustment of the pinion carrier 69 may be indicated. The indicator has not been shown, but may be provided with indicia to indicate various conditions in connection with the rotary pump or other parts of the apparatus.

The bottom of the casing 1 has a bearing 90 in a plane at one side of the drive shaft 13 and in vertical alinement with a bearing 91 connecting the long bearing 17 to a side wall of the compartment 4. In the bearings 90 and 91 is journaled a governor shaft 92 and mounted on said governor shaft, between the bearings 90 and 91, is a worm 93 meshing with a worm wheel 94 on the drive shaft 13.

The governor shaft 92 extends into the dome or cover 6 and is provided with a governor adapted to shift the governor rack 72. The governor comprises a head 95 adjustably mounted on the upper end of the shaft 92 and pivotally connected to said head are opposed governor arms 96 pivotally connected by links 97 to a sleeve 98 slidable on a governor shaft 92. A coiled spring 99 encircles the governor shaft 92, between the sleeve 98 and the head 95 and the expansive force of this spring holds the governor arms 96 retracted until centrifugal force causes said arms to shift the sleeve 98 against the action of the spring 99. The sleeve 98 has a spool portion 100 into which extends the angular upper end 101 of the governor rack 72, the relation of the spool 100 to the end 101 of the governor rack being such that the governor may freely operate and impart a reciprocable movement to the governor rack.

Considering the operation of the pumping apparatus, it has been noted that the governor and rotary pump are operated from the engine driven shaft 13. The governor will be driven at the same speed as the engine cam shaft and the ratio of gearing between the pump shaft 19 and the drive shaft 13 may be such that the rotary pump will be driven either at a reduced or greater speed relative to the engine. As the pumping capacity of the rotary pump depends upon the position of the ring or piston abutment 58, and since said ring is adjustable by the governor, it is obvious that increased speed of the engine may, through the governor, decrease the pumping action of the rotary pump, so that fuel will not be as forcibly supplied to the nozzle 54 to take care of any load placed on the engine. The ring or piston abutment 58 may be set or the governor adjusted so that the pump will at all times be operated to supply sufficient fuel for idling of the engine, and as the throttle 57 is opened there will be a richer mixture because of a greater portion of fuel than air; until the speed of the engine picks up to such an extent as to cause the governor to regulate the action of the pump for a less delivery of fuel, at which time the mixture becomes leaner for the load or less duty to be taken care of by the engine.

Considering various conditions under which my pump may operate, I will assume, as the first instance, an automobile descending a grade, in which case the automobile pushes the engine. The governor will automatically cut off the fuel, without any adjustment of the throttle. The engine may race, but there will be no fuel and consequently a saving. Should the usual practice of closing the throttle be followed out, when descending a long grade, such manual closing of the throttle will reduce the action of the pump, independent of the governor, as in no instance does the governor shift the throttle. When the bottom of the grade is reached and it becomes necessary for the engine to pull the car, the throttle is manually opened and such action adjusts the pump to supply the necessary fuel so that the engine may pick up the car. Of course the governor is then brought into action and will regulate the pump according to the speed desired.

As another instance of the office of the pump, consider traveling on a smooth street at a normal speed and then encountering a dirt or gravel road. It is obvious that such road will tend to slow down the engine, due to the load or braking action of the wheels, so it is necessary that more fuel be supplied if the automobile is to continue at the same speed on the dirt road as on the smooth street. This is automatically taken care of by the governor, for when the speed of the governor is reduced the piston abutment is lowered and the eccentricity of the pistons increased, so that there is an increased pumping action that supplies the necessary fuel. The reverse is in order when the automobile again reaches a smooth street, as there will be less load and consequently the governor will speed up to retard the action of the pump and cause the same to supply fuel in a proper proportion to the load.

To recapitulate, the drawings show a pumping apparatus that has been tested for results, but in actual practice parts of the pump, for instance, the governor, may be embodied in the crank case of an engine so that the pump will occupy a comparatively small space on an engine. It is apparent that the usual vacuum fuel feed system of an automobile may be eliminated together with complicated and expensive carbureters now used. My construction only necessitates an air intake connection, a jet and a throttle, and since the fuel is forcibly supplied to an engine in accordance to the duties to be performed thereby, with the engine properly proportioning the admixture of fuel and air, it is obvious that the fuel after leaving the pump may be heated or otherwise treated and placed in a better explosive condition, without in the least detarding or interfering with the supply of fuel delivered and regulated by the engine.

Furthermore, it is obvious that the pump and its governor can be used in various positions, for instance, horizontal, and that the greater part of the mechanism may operate in a lubricant without any danger of such lubricant finding its way into the fuel supply system. In using the terms "gas," "gasoline" or "kerosene," it is to be understood that my invention includes the use of any fuel.

What I claim is:—

1. A pumping apparatus adapted to supply fuel to an internal combustion engine, comprising a rotary engine driven pump having variable stroke pistons, means controlled by the speed of the engine adapted to regulate the stroke of the pump piston, and a priming device for said pump coaxially thereof.

2. A pumping apparatus adapted to supply fuel to an internal combustion engine, comprising a pump shaft adapted to be driven by the engine, a pump driven by said shaft and having variable stroke pistons, a governor adjusted piston abutment adapted to regulate the stroke of the pump pistons, and an over-running clutch mechanism carried by said pump shaft and adapted to prevent a reverse operation of said pump.

3. A pumping apparatus adapted to supply fuel to an internal combustion engine, comprising a pump shaft adapted to be driven by the engine, a pump driven by said shaft and having variable stroke pistons, a governor adjusted piston abutment adapted to regulate the stroke of the pump pistons, and stationary means coaxial of said pump shaft adapted to supply fuel to said pump.

4. The combination of an engine driven governor shaft, an engine driven pump shaft, and a rotary pump operated by said pump shaft and adapted to have its pumping capacity regulated by said governor shaft independent of said pump shaft, said rotary pump including radially disposed pistons and an adjustable piston abutment with the eccentricity of the abutment relative to the pistons determining the pump capacity of the pump.

5. The combination of an engine driven governor shaft, an engine driven pump shaft, a rotary pump of the reciprocatory piston type operated by said pump shaft and adapted to have its pumping capacity regulated by said governor shaft independent of said pump shaft, and means interposed between the governor shaft and said pump adapted to guide the outer ends of the pump pistons so that said pistons will have a defined stroke.

6. A fuel pump comprising a rotary cylinder block, pistons reciprocable in said cylinder block, stationary means axially of said cylinder block adapted to supply fuel to said pump, an adjustable piston abutment about said cylinder block adapted to regulate the stroke of the pump pistons and the pumping capacity of the pump, and an engine driven governor adapted to adjust said abutment so that the fuel supplied by said pump will be in proportion to the speed of the governor.

7. In a fuel feed supply for an internal combustion engine wherein fuel is supplied to meet the various speeds and loads of the engine, and wherein a nozzle is adapted to spray the fuel so that it may commingle with air and provide an explosive mixture for the engine, means for supplying the fuel for the nozzle and such mixture, said means comprising a rotary fuel pump, a governor operated by the engine and adapted to regulate the pumping capacity of the pump, and an indicator operated from said governor.

8. A fuel feed supply as in claim 7, wherein said pump includes a cylinder block, pistons in said cylinder block, and an abutment about said cylinder block adapted to be shifted by the governor to regulate the strokes of the pump pistons.

9. In a fuel feed supply for an internal combustion engine wherein fuel is supplied to meet the various speeds and loads of the engine, and wherein a nozzle is adapted to spray the fuel so that it may commingle with air and provide an explosive mixture for the engine, means for supplying the fuel for the nozzle and such mixture, said means comprising a rotary fuel pump, having reciprocable pistons, an adjustable abutment for said pump pistons adapted to regulate the pumping capacity of the pump, a governor operated from the engine, an indicator, and means actuated by said governor adapted to simultaneously adjust said abutment and operate said indicator.

10. A fuel feed supply as in claim 9, wherein said means includes a pinion carrier and racks.

11. In a fuel feed supply for an internal combustion engine, a pump adapted to forcibly supply fuel to the engine, means adapted to regulate the pumping capacity of the pump, a governor driven by the engine adapted to adjust said regulating means, and a throttle adapted to adjust said regulating means.

12. A fuel feed supply as in claim 11, wherein the throttle is adapted for adjusting the regulating means independent of the governor.

13. A fuel feed supply as in claim 11, wherein the pump is of the variable piston stroke type and said regulating means includes an abutment to regulate the piston stroke.

14. In a fuel feed supply for an internal combustion engine, a pump adapted to forcibly supply fuel to the engine, means adapted to regulate the pumping capacity of the pump, and a throttle adapted to adjust said regulating means.

15. In a fuel feed supply for an internal combustion engine, a source of fuel, means for forcibly supplying the fuel to the engine, and a throttle adapted to regulate the supply of fuel according to the requirement of the engine.

16. In a fuel feed supply for an engine, a source of fuel, means for forcibly supplying the fuel to the engine, a governor driven from the engine and adapted to regulate said fuel supplying means, and a throttle adapted to regulate said fuel supplying means independent of said governor.

17. A fuel feed supply as in claim 16, and indicator operating means actuated from said regulating means.

In testimony whereof I affix my signature in presence of two witnesses.

GEZA HORVATH.

Witnesses:
A. M. DORR,
G. E. McGRANN.